(12) United States Patent
Narita et al.

(10) Patent No.: US 6,813,402 B2
(45) Date of Patent: Nov. 2, 2004

(54) FIBER, PROBE AND OPTICAL HEAD OF MULTIPLE OPTICAL PATH ARRAY TYPE AND METHODS FOR MANUFACTURING THE SAME

(75) Inventors: Yoshihito Narita, Hachioji (JP); Tsutomu Inoue, Hachioji (JP)

(73) Assignee: Jasco Corporation, Tokyo (JP)

( * ) Notice: Subject to any disclaimer, the term of this patent is extended or adjusted under 35 U.S.C. 154(b) by 314 days.

(21) Appl. No.: 10/076,302

(22) Filed: Feb. 19, 2002

(65) Prior Publication Data

US 2002/0126937 A1 Sep. 12, 2002

(30) Foreign Application Priority Data

Mar. 8, 2001 (JP) .......................................... 2001-65665

(51) Int. Cl.$^7$ ................................................ G02B 6/12
(52) U.S. Cl. ........................................................ 385/12
(58) Field of Search ................................ 385/8–12, 15, 385/31, 39, 120, 88, 90, 123, 136, 137, 115; 313/524; 29/850, 837, 852, 830, 843, 863

(56) References Cited

U.S. PATENT DOCUMENTS

| 3,586,895 A | * | 6/1971 | Sowers et al. | ............... | 313/524 |
| 6,522,817 B2 | * | 2/2003 | Moran | ......................... | 385/120 |

FOREIGN PATENT DOCUMENTS

| JP | A 2000-132856 | 5/2000 |
| JP | A 2000-215499 | 8/2000 |
| JP | A 2000-223767 | 8/2000 |

OTHER PUBLICATIONS

Yatsui et al., "Subwavelength–sized phase–change recording with a silicon planar apertured probe", SPIE, vol. 3791, pp. 76–84, Jul. 1999.
Lee et al., "Nanometric aperture arrays fabricated by wet and dry etching of silicon for near–field optical storage application", J. Vac. Sci. Technol. B, vol. 17, No. 6, pp. 2462–2466, Nov./Dec. 1999.
Yatsui et al., "High–density–speed optical near–field recording–reading with a pyramidal silicon probe on a contact slider", Optics Letters, vol. 25, No. 17, pp. 1279–1281, Sep. 2000.

* cited by examiner

Primary Examiner—Akm Enayet Ullah
(74) Attorney, Agent, or Firm—Oliff & Berridge, PLC

(57) ABSTRACT

It is an object of the present invention to provide a probe that may correspond to various styles of measurement when used in microscopes and that is also applicable to recording devices and an optical head using the same, as well as to provide a method for manufacturing such a probe in a simple and costless manner; for achieving such objects, the method for manufacturing a multiple optical path array type probe according to the present invention is arranged in that in a light guiding material including a substrate that functions as a clad and a light guiding path formed of a component that functions as a core for guiding light or as a waveguide, the light guiding material includes a plurality of light guiding paths aligned to be parallel to each other within the substrate that functions as a clad, and tip end portions of the light guiding paths are sharpened through chemical etching of an end surface that is orthogonal to the plurality of light guiding paths.

18 Claims, 6 Drawing Sheets

2 : multiple optical path array type probe

2 : multiple optical path array type probe

US 6,813,402 B2

FIBER, PROBE AND OPTICAL HEAD OF MULTIPLE OPTICAL PATH ARRAY TYPE AND METHODS FOR MANUFACTURING THE SAME

RELATED APPLICATIONS

The present application claims the priority of Japanese Patent Application No.2001-65665 filed on Mar. 8, 2001, which is incorporated herein.

FIELD OF THE INVENTION

The present invention relates to improvements in multiple optical path array type probes including a plurality of light guiding paths, multiple optical path array type optical heads employing the same, and particularly in refinements of distances between optical paths included in probes, and in methods for manufacturing the same.

BACKGOUND OF THE INVENTION

It was generally the case with devices or equipments in which optical techniques are applied that limits in their performances were determined by wavelengths of light. For instance, it is impossible to observe any objects that are smaller than wavelengths of light by using a general optical microscope, and its resolution is limited.

Optical memories and similar were also known as recording materials for recording information applicable to computers or the like by using light. It was the case with such optical memories that upper limits of information recording densities were determined by diffraction limits of light and only marks of several hundreds of nm and thus approximating wavelengths of light could be recorded/read.

Novel techniques are being developed for such devices and equipments employing light in these years with which it is possible to get rid of restraints of wavelengths of light. There are techniques employing evanescent light or near-field light and are being paid attention to in view of their applicability to objects and regions that are smaller than wavelengths of light.

The following explanations will be made on the basis of an example of a microscope in which evanescent light or near-field light is applied. Known measuring theories are such in which a field of evanescent light or near-field light is generated on a sample surface into which a tip end portion of a probe is inserted for accordingly scattering the evanescent light or near-field light and thus measuring the scattered light, or such in which a field of evanescent light or near-field light is generated at the tip end portion of the probe whereupon the evanescent light or near-field light of the tip end portion of the probe is hit against the sample surface for scattering the evanescent light or near-field light and accordingly measuring the scattered light.

However, conventionally used probes were arranged in that a single light guiding path was formed in a single probe so that only one tip end portion to be inserted into a field of evanescent light or near-field light or only one tip end portion for generating such evanescent light or near-field light was present as well. Thus, it was time-consuming and energy-taking for observing surface information within a specified range of an object to be measured or an image on its a surface by using such a microscope with which such a region smaller than wavelengths of light could be observed.

While it is possible to perform optical analysis at high space resolution when using evanescent light or near-field light, excitation regions and measuring regions were partly overlapping in conventional probes so that it was required in evaluation of semiconductors to selectively measure emission of light right next to the excitation region which, however, could not be realized.

In the field of optical memories, near-field optical recording techniques are being paid attention to as compact recording devices capable of recording a large volume of information without being restrained by wavelengths of light for further improving recording densities. According to the near-field optical recording techniques, it is possible to perform recording/reading of an even larger volume of information by using media of identical size as those of conventional optical memories which is affected by improvements in recording densities.

An arrangement of an optical head used in such optical memories in which a plurality of near-field probes is aligned in a planar manner is being actively studied. Manufacturing costs caused a burden since a method was employed in which multi-staged film-forming/etching processes were performed with respect to Si wafers for manufacturing such probes.

Also, the accuracy of processing directly determined intervals between members corresponding to tip end portions of the probes. Thus, limits in correctness of shapes or intervals between tip end portions were determined through accuracy of processing so that intervals between tip end portions of probes of conventional optical heads fell in the range of approximately 30 $\mu$m and the intervals were thus too large in view of recording densities. However, it is extremely difficult to manufacture the intervals between members corresponding to tip end portions of probes by orders of several $\mu$m, and developments in novel manufacturing techniques were being desired. It was further impossible to apply improved techniques related to throughputs as cultivated in conventional techniques in the field of optical fibers when employing techniques for performing such processing.

Shapes of tip end portions of probes that could be manufactured were also limited.

The present invention has been made in view of the above subjects, and it is an object thereof to provide a probe that may correspond to various styles of measurement when used in microscopes and that is also applicable to recording devices, an optical head using the same, and a method for manufacturing such a probe in a simple and costless manner.

SUMMARY OF THE INVENTION

For achieving such objects, the method for manufacturing a multiple optical path array type probe according to the present invention is arranged in that in a light guiding material including a substrate that functions as a clad and a light guiding path formed of a component that functions as a core for guiding light or as a waveguide, the light guiding material includes a plurality of light guiding paths aligned to be parallel to each other within the substrate that functions as a clad, and tip end portions of the light guiding paths are sharpened through chemical etching of an end surface that is orthogonal to the plurality of light guiding paths.

In the method for manufacturing a multiple optical path array type probe of the present invention, the substrate that functions as the clad of the light guiding material consists of pure $SiO_2$ and the light guiding paths of the light guiding material of a material in which $SiO_2$ includes components such as metal or metal oxides, and chemical etching is performed by impregnating an end surface of the light guiding material into a HF—NH₄ type buffer solution for a specified period of time.

It is preferable to manufacture the multiple optical path array type probe according to the present invention by using the above method for manufacturing a multiple optical path array type probe.

The multiple optical path array type probe according to the present invention is arranged in that in a light guiding material including a substrate of pure $SiO_2$ that functions as a clad and a light guiding path of $SiO_2$ including components such as metal or metal oxides formed of a component that functions as a core of a material for guiding light or as a waveguide, the light guiding material includes a plurality of light guiding paths aligned to be parallel to each other within the substrate that functions as a clad, and tip end portions of the light guiding paths are sharpened.

The multiple optical path array type probe according to the present invention is arranged in that in a light guiding material including a substrate that functions as a clad and a light guiding path formed of a component that functions as a core for guiding light or as a waveguide, the light guiding material includes a plurality of light guiding paths aligned to be parallel to each other within the substrate that functions as a clad, tip end portions of the light guiding paths are sharpened, and the respective light guiding paths are arranged in that an interval between mutually adjoining light guiding paths is not more than 20 μm.

In the multiple optical path array type probe according to the present invention, it is preferable that the light guiding material is arranged in that a light transmittance preventing means is provided between the respective optical paths so that light is prevented from being transmitted between the respective optical paths.

In the multiple optical path array type probe according to the present invention, it is preferable that the light transmittance preventing means is a thin film layer made of gold.

In the multiple optical path array type probe according to the present invention, it is preferable that a plurality of light guiding paths are arranged in a linear form on an end surface that is orthogonal to the plurality of light guiding paths of the light guiding material.

In the multiple optical path array type probe according to the present invention, it is preferable that a plurality of light guiding paths are arranged in a latticed form on an end surface that is orthogonal to the plurality of light guiding paths of the light guiding material.

In the multiple optical path array type probe according to the present invention, it is preferable that the probe of multiple optical path is any one of a AFM probe, STM probe or a near-field probe.

In the multiple optical path array type probe according to the present invention, it is preferable that a mask of a light blocking material exhibiting ductility is formed at tip end portion of the sharpened light guiding paths, and wherein the probe further comprises holding materials for adjusting an amount of pressing, when forming an aperture of a specified size on all of the plurality of light guiding paths upon pressing the mask against a planar surface, to be of an aperture diameter that is formed upon pressing the same against the planar surface.

The multiple optical path array type optical head according to the present invention is arranged to be an optical head for recording/reading information for a near-filed optical memory by using the above multiple optical path array type probe.

In the multiple optical path array type optical head according to the present invention, it is preferable that the probe preferably comprises distance holding materials for securing a distance between a tip end of the probe and a surface of a recording material for recording/reading information.

The multiple optical path array type fiber according to the present invention is arranged in that in a light guiding material including a substrate that functions as a clad elongated in a linear manner and a light guiding path formed of a component that functions as a core for guiding light into the linear substrate or as a waveguide and extending in an extending direction of the substrate, the light guiding material includes a plurality of light guiding paths aligned to be parallel to each other within the substrate that functions as a clad.

DETAILED DESCRIPTION OF THE PREFERRED EMBODIMENT

The multiple optical path array type probe of the present invention will now be explained on the basis of one embodiment of the present invention.

Figure 1:
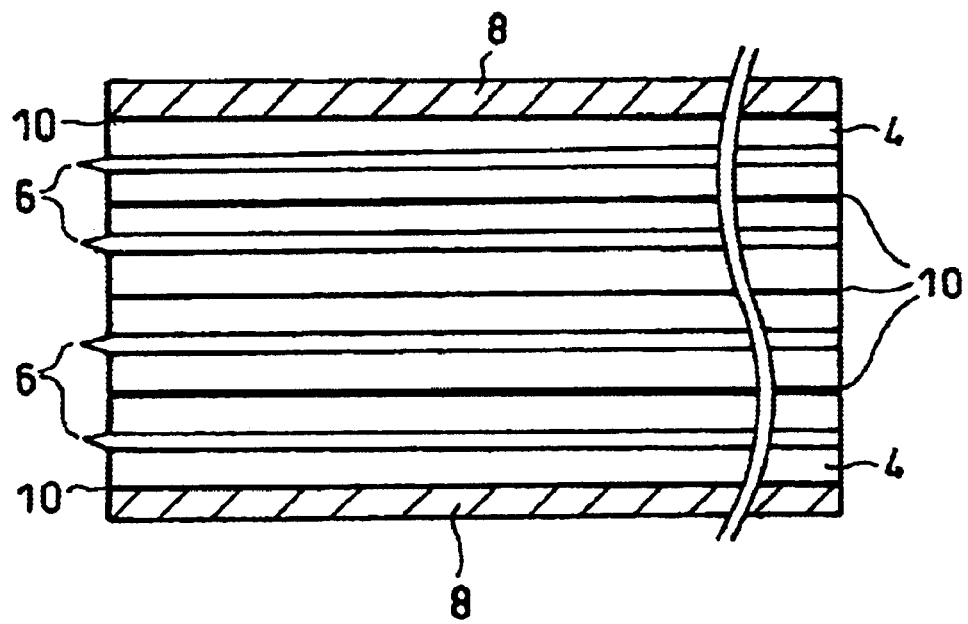
FIG. 1 is a longitudinal sectional view of a multiple optical path array type probe representing one embodiment of the present invention.

FIG. 1 illustrates a longitudinal sectional view of a multiple optical path array type probe representing one embodiment of the present invention.

The multiple optical path array type probe 2 illustrated in the drawing is arranged in that in a light guiding material including a substrate 4 that functions as a clad and a light guiding path 6 formed of a component that functions as a core for guiding light or as a waveguide, wherein the light guiding material includes a plurality of light guiding paths 6 aligned to be parallel to each other within the substrate 4 that functions as a clad, with tip end portions of the light guiding paths being sharpened.

An outer periphery of the clad may be, if necessary, covered by a protection layer 8 made of resin or similar.

It should be noted that it is preferable that the intervals between mutually adjoining light guiding paths 6 of the multiple optical path array type probe 2 of the present invention are not more than 20 μm, and more preferably not more than 10 μm.

In this manner, the smaller the intervals between light guiding paths 6 are, the higher the density of the light guiding paths will become so that it is possible to increase a measuring range that may be measured within an unit time and to perform more detailed measurement of an object to be measured when used in a measuring device such as a microscope. When used in an optical head as will be described later in details, it will be possible to improve the recording density.

It is preferable that the multiple optical path array type probe 2 of the present invention is arranged in that its substrate that functions as a clad is made of pure $SiO_2$ and in that the light guiding paths formed of a component that functions as a core for guiding light or a waveguide is made of a material in which $SiO_2$ includes components such as metal or metal oxides.

By forming the light guiding paths of such a material in which quartz is included as a main component, sharpening of the light guiding paths 6 may be performed upon chemical etching in the manufacturing method as will be described later in details so that it is possible to adjust the shape of all tip end portions of the light guiding paths to be substantially uniform while it is further possible to arbitrarily determine the shape of the tip end portions of the light guiding paths. As for the intervals between light guiding paths, intervals between light guiding paths may be directly defined by intervals that are preliminarily adjusted and manufactured when manufacturing light guiding materials that undergo chemical etching, and it is accordingly possible to easily adjust the intervals between light guiding paths to be of fine intervals.

Since a probe that is manufactured by using such a material is applicable to conventional techniques related to optical fibers or the like as it is, it is also of advantage that it enables application to polarization or broad wavelength bands.

It should be noted that a material of the fiber might be one of quartz glass, chalcogenide glass (for infrared), fluoride glass, silicon or plastic. When using, for instance, quartz glass, a core portion is formed of $SiO_2$ doped with Ge while a clad portion is formed of $SiO_2$ doped with F.

Since such multiple optical path array type probes were conventionally manufactured by using Si probes, once a shape of the tip end of the light guiding paths was preliminarily determined by processing Si, the manufacture was limited to that very shape whereas the present invention enables it to freely select the shape from product to product. Moreover, since the intervals between respective tip end portions of the light guiding paths are not restrained by the accuracy of processing Si, it is possible to set minute intervals by orders of several $\mu$m.

It should be noted that it is necessary to consider the problem of transmittance of light occurring between light guiding paths. Conventionally, intervals between light guiding paths were approximately 30 $\mu$m and thus remarkably larger than wavelengths of light, and it was not necessary to consider the order of photons transmitting through a single light guiding path jumping over to adjoining light guiding paths; however, with the intervals between light guiding paths becoming several $\mu$m, which could be realized by the present invention, and only several times larger than wavelengths of light and thus close to wavelengths of light, a phenomenon in which photons jump over to adjoining light guiding paths are well possible.

Thus, the present invention has provided light transmittance preventing means between respective light guiding paths of the light guiding material to obtain an arrangement in which light does not mutually transmit between the respective light guiding paths (in which no photons jump over).

In FIG. 1, light transmittance preventing means 10 are provided between respective light guiding paths 6. In one of the embodiments as illustrated in FIG. 1, light transmittance preventing means 10 are also provided between the protection layer 8 and the light guiding paths 6.

Since a 1:1 relationship may be achieved of an entrance and an exit of photons in the light guiding paths 6, high accuracy may also be maintained even in techniques for measuring or recording.

It should be noted that the light transmittance preventing means 10 are arranged of thin film layers of gold in the multiple optical path array type probe of the present embodiment. In this manner, it is possible to provide light transmittance preventing means through relatively simple methods such as preliminarily evaporating gold on a surface of the light guiding paths.

Figure 2A:
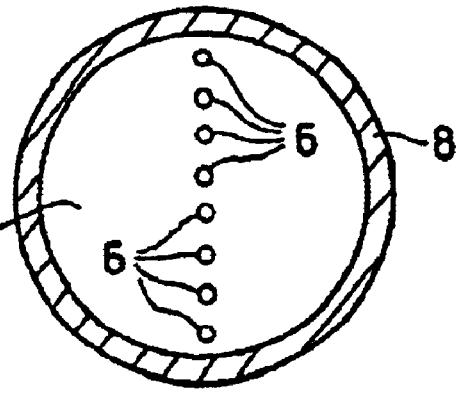
FIGS. 2(a)–2(c) are vertical sectional views of embodiments of the multiple optical path array type probe according to the present invention.

FIG. 2 illustrates a vertical sectional view of one embodiment of the multiple optical path array type probe of the present invention. It should be noted that components corresponding to components identical to those of FIG. 1 are marked with the same reference numerals and explanations thereof will be omitted.

As illustrated in (a) of the same drawing, it is preferable that a plurality of light guiding paths 6 are disposed in a linear manner on an end surface that is orthogonal to the plurality of light guiding paths 6 of the light guiding material in the multiple optical path array type probe of the present invention.

If the light guiding paths 6 are disposed in a linear manner like this case, it is possible to achieve an advantage in that positional alignment of the respective light guiding paths 6 may be easily performed, and if such a probe is used, for instance, as an optical head, one light guiding path may be used for reading track information while the remaining light guiding paths may be used for recording/reading of information.

Figure 2B:
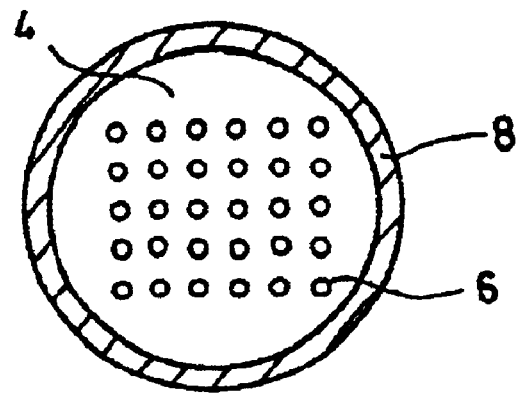

As illustrated in FIG. 2(b), it is also preferable that a plurality of light guiding paths are disposed in a latticed manner on an end surface that is orthogonal to the plurality of light guiding paths of the light guiding material in the multiple optical path array type probe of the present invention.

Similar to the linear arrangement, such a multiple optical path array type probe is also advantaged in that positional alignment of the respective light guiding paths 6 may be easily performed when used in equipments, and moreover, simultaneous measurement may be performed by the plurality of light guiding paths when using the same for measuring in, for instance, a microscope so as to remarkably increase the measuring range of which measurement may be performed per unit time. When using such a probe as an optical head, not only can one light guiding path be used for reading track information while the remaining light guiding paths are used for recording/reading of information, but also is it possible to achieve more refined recording densities upon adjusting angles of use when compared to those of linear arrangement as well as increase the amount of recording/reading information of a single action.

Figure 2C:
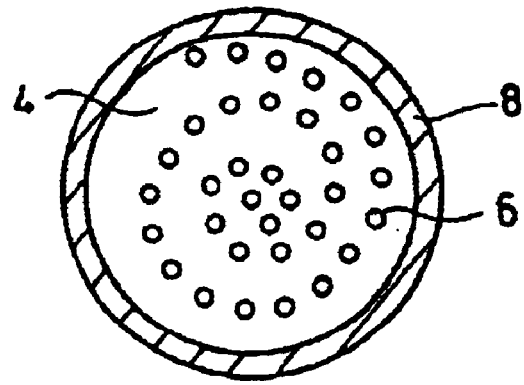

Further, as illustrated in FIG. 2(c), it is also preferable that a plurality of light guiding paths are disposed in a spiral manner on an end surface that is orthogonal to the plurality of light guiding paths of the light guiding material in the multiple optical path array type probe of the present invention.

While positional alignment of the respective light guiding paths 6 may become somewhat difficult in such a multiple optical path array type probe when used in equipments, when using the same for measurement by using, for instance, a microscope, the probe may be rotated with a central axis of the probe being the center so that measurement of a range corresponding to substantially all of a sectional portion of the probe may be performed at substantially all points.

While such a multiple optical path array type probe of the present invention is applicable to a variety of purposes, it is preferable that this be an AFM probe, STM probe or a near-field probe.

When applying the multiple optical path array type probe of the present invention of the above-described shape to an optical measuring device such as a microscope, one light guiding path may be used for exciting an object to be measured for observing a condition in which an excited region such as a near-field gradually expands. It will also be possible to observe, for instance, how a carrier for exciting an object to be measured moves. Since planar information related to objects to be measured may be observed which had so far been impossible, various applications thereof are possible.

A method for manufacturing the above explained multiple optical path array type probe of the present invention will now be explained.

Manufacturing Method

The multiple optical path array type probe of the present invention is arranged in that in a light guiding material including a substrate that functions as a clad and a light guiding path formed of a component that functions as a core for guiding light or as a waveguide, the light guiding material includes a plurality of light guiding paths aligned to be parallel to each other within the substrate that functions as a clad, and tip end portions of the light guiding paths are sharpened through chemical etching of an end surface that is orthogonal to the plurality of light guiding paths.

Explanations will follow based on a concrete example of manufacturing.

As for the light guiding material, a $SiO_2$ glass fiber with a clad made of pure $SiO_2$ glass and a core of $SiO_2$ glass including $GeO_2$ is used. In the clad of the fiber, a plurality of light guiding paths comprised of a core is aligned in parallel with each other.

An etching process for reducing a clad diameter is performed as a preliminary stage of etching for sharpening. More particularly, upon cutting one end of the fiber and impregnating the same into a buffer solution, an etching speed may vary depending on an amount of doping from a peripheral portion to a central portion of the core. For instance, in case an end surface of a high density doped fiber with an amount of addition of $GeO_2$ being 25 mol % is etched by using a buffer solution mixed at a volumetric ratio of HF (50%):$NH_4F$ (40%):$H_2O$=X:1:1, the core will be concaved when X<1.7 is satisfied at room temperature (approximately 23° C.) while it may be sharpened when X>1.7 is satisfied.

Thus, the clad diameter is reduced in a first stage by using a buffer solution of X=1.7 (in which the etching speeds of the clad and the core are identical). The clad diameter may be controlled upon controlling conditions such as etching time.

Next, sharpening is performed in a second stage by using a buffer solution of X>1.7. In case, for instance, X=5 is satisfied, an angle of sharpening will be 25° and the radius of curvature of the tip end will become minimum which is not more than 5 nm after elapse of 1 hour. It should be noted that while the radius of curvature of the tip end increases to approximately 10 nm when the optimal time is exceeded, the radius would not increase any further. In case of X=10, the angle of sharpening will be minimum which is 20°.

The tip end of the light guiding material thus formed includes a flat head light guiding material as illustrated in FIG. 1 and a plurality of sharp head light guiding paths provided on an end surface portion of the flat head surface.

Figure 3A:
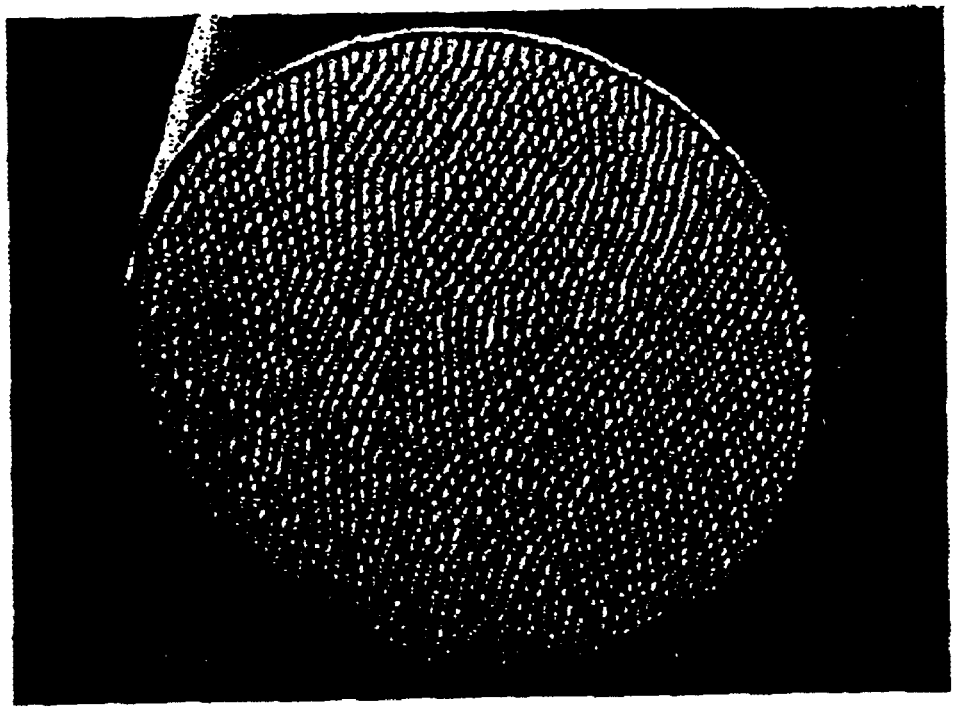
FIGS. 3(a)–3(b) are enlarged photographs of the multiple optical path array type probe manufactured in accordance with the manufacturing method of the present invention.
Figure 3B:
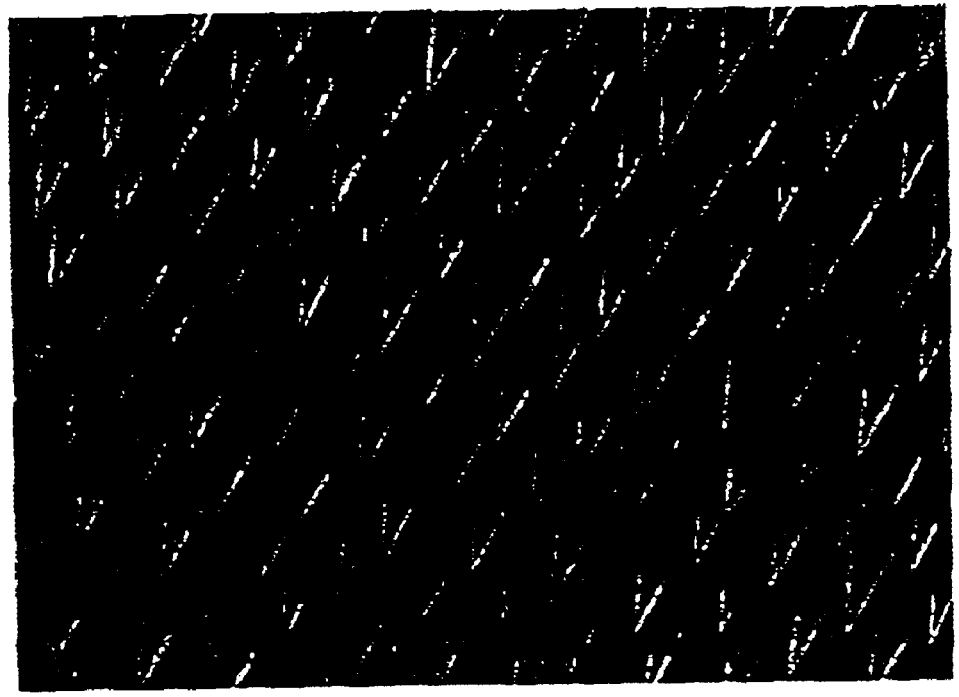

An enlarged photograph of a multiple optical path array type probe that has been actually manufactured in accordance with the method for manufacturing the multiple optical path array type probe of the present invention is shown in FIG. 3. FIG. 3(a) is an enlarged view of an overall end surface of the probe while FIG. 3(b) is an enlarged view in which the light guiding path portion has been further enlarged.

In this manner, since sharpening of light guiding paths is performed through chemical etching in the method for manufacturing a multiple optical path array type probe of the present invention, all of the plurality of light guiding paths can be formed to be of substantially arbitrary shape (angle of sharpening).

Since the light guiding material needs to be simply impregnated in a buffer solution for a specified time in the present method for manufacturing, easy manufacture is enabled, and it is possible to remarkably reduce costs when compared to conventional methods for manufacturing a multiple optical path array type probe.

It should be noted that the present invention is not limited to the above-disclosed chemical etching only.

When treating evanescent light or near-field light by using such a probe, masks were provided at tip end portions of the sharpened light guiding paths of the probe wherein the masks were used upon providing apertures that were smaller than wavelengths of light.

Figure 4A:
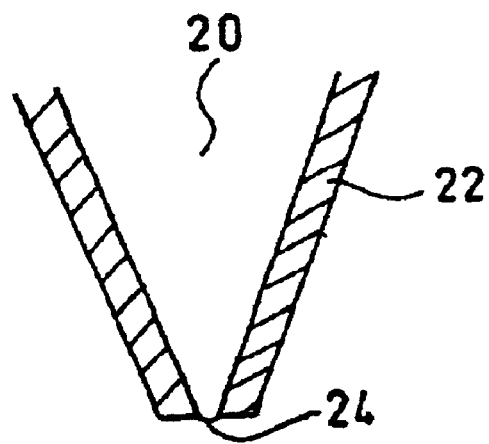
FIGS. 4(a)–4(c) are explanatory views or explaining an aperture of a mask provided at the probe.

FIG. 4 illustrates an explanatory view for explaining such apertures of masks formed at the probe.

As illustrated in (a) of the same drawing, a mask 22 made of a light blocking material is provided at the tip end portions 20 of the light guiding paths, and an aperture 24, which is smaller than wavelengths of light, is provided as well.

While various methods are known for forming such an aperture, one method that could be simply performed was a method in which an aperture was formed by pressing the mask against a planar surface.

Figure 4B:
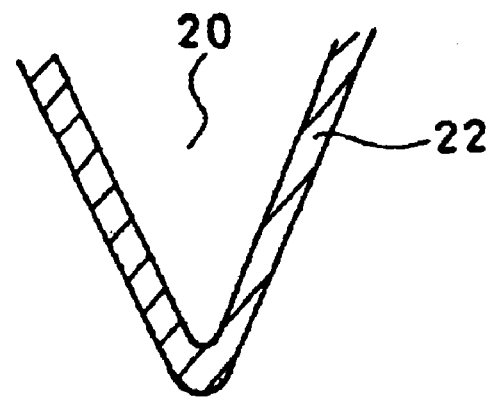
Figure 4C:
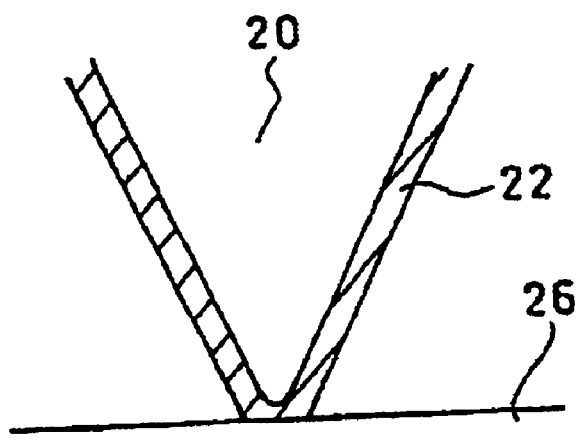

In this method, the mask 22 is formed on the tip end portion 20 of the light guiding path by using a light blocking material exhibiting ductility as illustrated in FIG. 4(b). As illustrated in FIG. 4(c), the tip end portion is pressed against a planar surface 26 for obtaining an aperture of desired size.

While devices or jigs for performing pressing while measuring sizes of apertures were conventionally known, such operations of forming apertures required extreme preciseness and were thus quite complicated.

In contrast thereto, the present invention has enabled an arrangement in which a pressing method, which simplifies operations for forming such apertures, can be employed.

In the multiple optical path array type probe of the present invention, it is preferable that a mask is formed of a light blocking material exhibiting ductility at tip end portion of the sharpened light guiding paths, and that the probe further comprises holding materials for adjusting an amount of pressing, when forming an aperture of a specified size on all of the plurality of light guiding paths upon pressing the mask against a planar surface, to be of an aperture diameter that is formed upon pressing the same against the planar surface.

Such a holding material may be formed by preliminarily arranging the same to the light guiding material prior to chemical etching.

First, it should preliminarily be determined to what extent the light guiding path is to be projected from the end surface of the probe, the degree of its sharpening angle and of its length. Upon determining these points, the density of the buffer solution to be used will be determined, and it is further determined what kind of treatment shall be performed for what length of time for obtaining such length and sharpening angle.

Since the size of the aperture diameter of the tip end portions of the light guiding paths is determined by the degree of projection of the holding material from the end surface of the probe, the amount of projection of the holding material that is to be the desired aperture diameter can inversely be calculated from the determined length, and the holding material is formed of a material that is not to be eroded through chemical etching to become the inversely calculated amount of projection.

FIG. 5 illustrates an explanatory view when forming such a holding material. It should be noted that portions corresponding to components that are identical to those of FIG. 1 are marked with identical reference numerals and explanations thereof are omitted.

A schematic longitudinal sectional view of the multiple optical path array type probe of the present invention is illustrated in (a) of the same drawing. The light guiding material as illustrated herein comprises holding materials 30 by an amount of projection as inversely calculated from the sharpening angle and length of the light guiding paths as preliminarily determined. The material that is not eroded through chemical etching may be formed by using a generally known material. In the present embodiment, the holding materials are formed of boron. The holding materials may be formed by making boron be contained in $SiO_2$ that is to become the clad material at high density, or boron may be alternatively used singly.

Figure 5A:
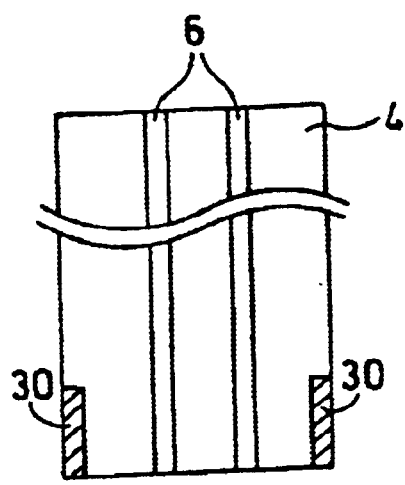
FIGS. 5(a)–5(d) are explanatory views for forming a holding material at the multiple optical path array type probe of the present invention.
Figure 5B:
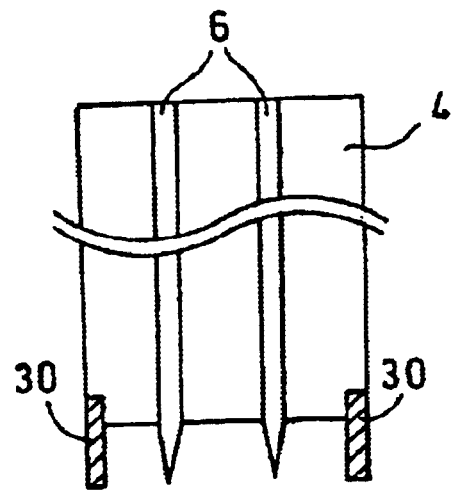
Figure 5C:
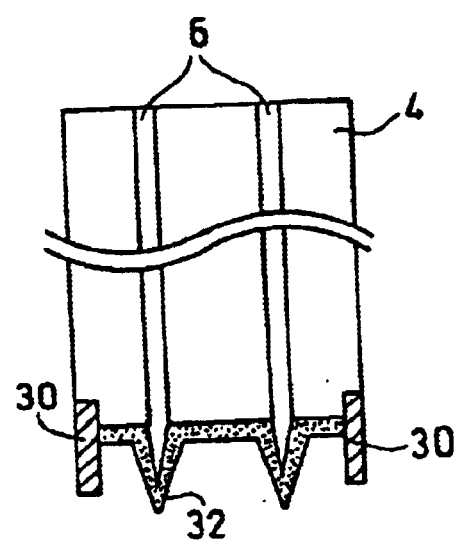

When performing chemical etching of such a light guiding material, the tip end portions of the light guiding paths are sharpened while the holding materials remain as illustrated in FIG. 5(b). As illustrated in FIG. 5(c), the mask 32 is then formed on the sharpened light guiding paths of a light blocking material exhibiting ductility upon performing treatments such as evaporating gold.

Figure 5D:
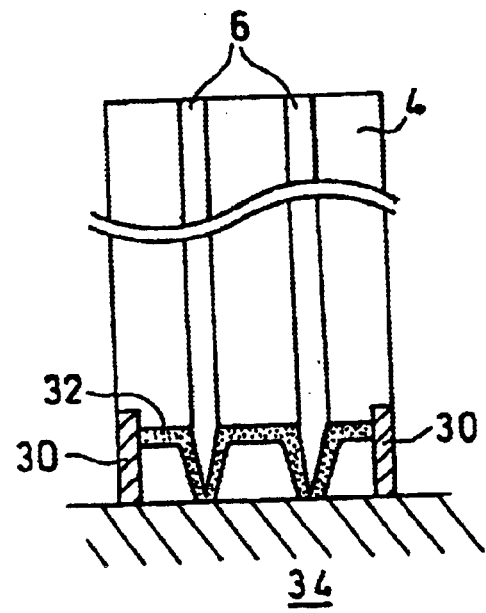

When the tip end portions of the light guiding paths are then pressed against the planar surface 34 as illustrated in FIG. 5(d), the holding materials prevent the light guiding paths from being excessively pressed against the planar surface 34 so that all tip end portions of the light guiding paths may be formed with apertures of substantially desired size.

It should be noted that the holding materials may be formed on the entire outer periphery of the end surface portion of the light guiding material that undergoes chemical etching or only on several spots of the outer periphery, and there are not particular limits as long as the arrangement is capable of preventing the tip end portions of the light guiding paths from being excessively pressed against the planar surface 34 for forming apertures of substantially desired sizes on the tip end portions of the light guiding paths.

The above-explained multiple optical path array type probe of the present invention may be favorably used as an optical head for recording/reading information on a near-field optical memory.

Figure 6A:
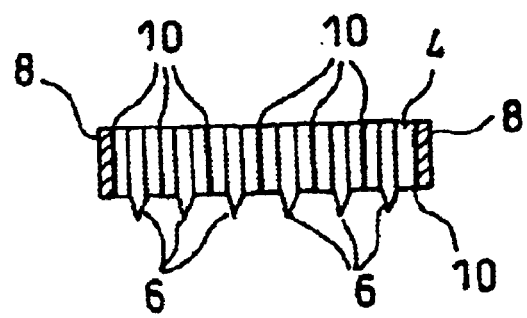
FIGS. 6(a)–6(c) are schematic views of embodiments of the multiple optical path array type optical head.

FIG. 6 illustrates a schematic view of one embodiment of a multiple optical path array type optical head. It should be noted that components corresponding to components identical to those of FIG. 1 are marked with the same reference numerals and explanations thereof will be omitted.

As illustrated in the drawing, when arranging a multiple optical path array type optical head by using the multiple optical path array type probe of the present invention, it is preferable that its outer shape is plate-like. In case its shape is plate-like, it is possible to achieve downsizing of a recording device for performing recording onto the recording material.

Figure 6B:
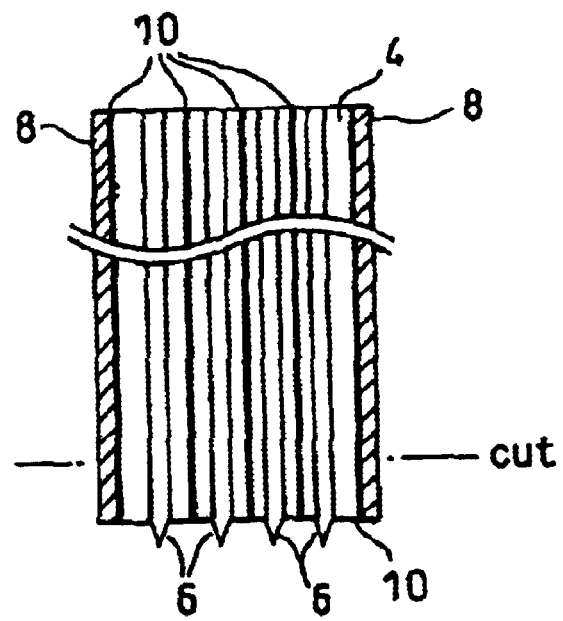

While various methods for manufacturing such a plate-like multiple optical path array type probe may be employed, one example is a method as illustrated in FIG. 6(b) in which an elongated light guiding material is employed which one end surface undergoes chemical etching for sharpening the light guiding paths 6 which are then cut at a desired thickness, or it may alternatively be a method in which a light guiding material that has preliminarily been formed in a plate-like shape undergoes chemical etching.

It should be noted that in the method employing an elongated light guiding material, a plurality of multiple optical path array type optical heads might be manufactured by repeatedly performing chemical etching of the end surface and cutting after cutting the material once.

Figure 6C:
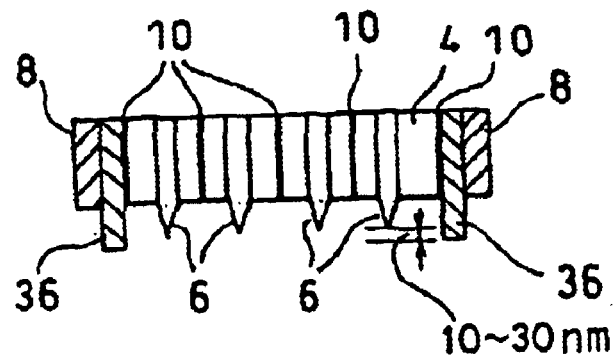

In the multiple optical path array type optical head of the present invention, it is preferable that distance holding materials 36 for securing a distance between tip ends of the probe and the recording material surface for recording/reading information are provided as illustrated in FIG. 6(c).

Such distance holding materials may be formed, similar to the holding materials, by using a manufacturing method using a material that is not eroded through chemical etching.

That is, it is possible to inversely calculate how to maintain the distance with respect to the recording material on the basis of the projection length of the light guiding paths so that the holding materials may be formed of a material that is not eroded through chemical etching to become the amount of projection obtained through inversed calculation.

In the multiple optical path array type optical head of the present invention, it is alternatively possible to provide holding materials on the entire outer periphery of the light guiding material or on several spots thereof whereupon an amount of erosion of portions of the clad or the light guiding paths is adjusted through chemical etching so as to use the remaining holding materials as the distance holding materials as they are.

It should be noted that it is preferable to set the distance between the tip end portions of the light guiding paths and the recording surface of the recording material to be in the range of 10 to 30 nm in the thus provided distance holding materials. This is because this range makes it possible to favorably use near-field light.

As explained so far, according to the method for manufacturing a multiple optical path array type probe of the present invention, it is possible to manufacture probes with distances between light guiding paths being extremely fine in an easy manner.

Moreover, according to the method for manufacturing a multiple optical path array type probe, the multiple optical path array type probe and the multiple optical path array type optical head of the present invention, it is possible to provide an arbitrary number of light guiding paths while it takes only as much trouble as manufacturing a single probe.

Since the shape of the array type near-field probe can be freely controlled when compared to a case in which they are formed of Si base, the transmittance may be improved to an equivalent level as those of conventional fiber type near-field probes and may additionally be manufactured as low costs.

When applying the multiple optical path array type probe of the present invention to optical measuring equipments, planar distribution of emission, which is generated upon excitation of a region that is not larger than a wavelength of light on a single spot, can be simultaneously measured at a resolution that is not more than the wavelength.

As explained so far, according to the method for manufacturing a multiple optical path array type probe of the present invention, it is possible to easily manufacture a multiple optical path array type probe provided with an arbitrary number of light guiding paths.

According to the multiple optical path array type probe and the multiple optical path array type optical head of the present invention, the transmittance may be improved to a level equivalent to that of conventional fiber type near-field probes.

We claim:

1. A method for manufacturing a multiple optical path array type probe in which in a light guiding material including a substrate that functions as a clad and a light guiding path formed of a component that functions as a core for guiding light or as a waveguide, wherein the light guiding material includes a plurality of light guiding paths aligned to be parallel to each other within the single substrate that functions as a clad, and wherein the light guiding material is arranged so that a light transmittance preventing means is provided between the respective optical paths so that light is prevented from being transmitted between the respective optical paths, wherein tip end portions of the light guiding paths are sharpened through chemical etching of an end surface that is orthogonal to the plurality of light guiding paths, and wherein mask of a light blocking material and apertures are formed at tip end portion of the sharpened light guiding paths.

2. The method for manufacturing a multiple optical path array type probe as claimed in claim 1, wherein the substrate that functions as the clad of the light guiding material includes pure $SiO_2$ and the light guiding paths of the light guiding material of a material in which $SiO_2$ includes components such as metal or metal oxides, and wherein chemical etching is performed by impregnating an end surface of the light guiding material into a $HF-NH_4$ type buffer solution for a specified period of time.

3. A multiple optical path array type probe manufactured by using the method for manufacturing a multiple optical path array type probe as claimed in claim 1.

4. A multiple optical path array type probe in which in a light guiding material including a substrate that functions as a clad and a light guiding path formed of a component that functions as a core for guiding light or as a waveguide, wherein the light guiding material includes a plurality of light guiding paths aligned to be parallel to each other within the single substrate that functions as a clad, and wherein the light guiding material is arranged so that a light transmittance preventing means is provided between the respective optical paths so that light is prevented from being transmitted between the respective optical paths, wherein tip end portions of the light guiding paths are sharpened, and wherein mask of a light blocking material and apertures are formed at tip end portion of the sharpened light guiding paths.

5. A multiple optical path array type probe as claimed in claim 4, wherein the substrate that functions as the clad of the light guiding material includes pure $SiO_2$ and the light guiding paths of the light guiding material includes a material in which $SiO_2$ includes components such as metal or metal oxides.

6. A multiple optical path array type probe as claimed in claim 4, wherein the respective light guiding paths are arranged in that an interval between mutually adjoining light guiding paths is not more than 20 μm.

7. A multiple optical path array type probe as claimed in claim 4, wherein the light transmittance preventing means is a thin film layer made of gold.

8. A multiple optical path array type probe as claimed in claim 4, wherein a plurality of light guiding paths are arranged in a linear form on an end surface that is orthogonal to the plurality of light guiding paths of the light guiding material.

9. A multiple optical path array type probe as claimed in claim 4, wherein a plurality of light guiding paths are arranged in a latticed form on an end surface that is orthogonal to the plurality of light guiding paths of the light guiding material.

10. A multiple optical path array type probe as claimed in claim 4, wherein a plurality of light guiding paths are arranged in a spiral form on an end surface that is orthogonal to the plurality of light guiding paths of the light guiding material.

11. A multiple optical path array type probe as claimed in claim 4, wherein the probe of multiple optical path is any one of a AFM probe, STM probe or a near-field probe.

12. A multiple optical path array type probe as claimed in claim 4, wherein a mask of a light blocking material exhibiting ductility is formed at tip end portion of the sharpened light guiding paths, and wherein the probe further comprises holding materials for adjusting an amount of pressing, when forming an aperture of a specified size on all of the plurality of light guiding paths upon pressing the mask against a planar surface, to be of an aperture diameter that is formed upon pressing the same against the planar surface.

13. An multiple optical path array type optical head arranged to be an optical head for recording/reading information for a near-field optical memory by using the multiple optical path array type probe as claimed in claim 4.

14. The multiple optical path array type optical head as claimed in claim 13, wherein the probe comprises distance holding materials for securing a distance between a tip end of the probe and a surface of a recording material for recording/reading information.

15. A multiple optical path array type fiber in which in a light guiding material including a substrate that functions as a clad elongated in a linear manner and a light guiding path formed of a component that functions as a core for guiding light into the linear substrate or as a waveguide and extending in an extending direction of the substrate, wherein the light guiding material includes a plurality of light guiding paths aligned to be parallel to each other within the single substrate that functions as a clad, wherein the light guiding material is arranged so that a light transmittance preventing means is provided between the respective optical paths so that light is prevented from being transmitted between the respective optical paths, and wherein mask of a light blocking material and apertures are formed at tip end portion of the sharpened light guiding paths.

16. A multiple optical path array type probe manufactured by using the method for manufacturing a multiple optical path array type probe as claimed in claim 2.

17. A multiple optical path array type probe as claimed in claim 15, wherein the light transmittance preventing means is a thin film layer made of gold.

18. The method for manufacturing a multiple optical path array type probe as claimed in claim 1, wherein the light transmittance preventing means is a thin film layer made of gold.

* * * * *